(12) United States Patent
Ruzyski et al.

(10) Patent No.: US 7,617,530 B2
(45) Date of Patent: Nov. 10, 2009

(54) RIGHTS ELEVATOR

(75) Inventors: David M Ruzyski, Kirkland, WA (US);
James H. Hong, Seattle, WA (US);
Brian McNeil, Seattle, WA (US);
Anastasia C Doerr, Kirkland, WA (US);
Chris J. Guzak, Kirkland, WA (US);
Sterling M. Reasor, Bellevue, WA (US);
Charles W. Stabb, Seattle, WA (US);
Brian D. Wentz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 11/112,747

(22) Filed: Apr. 22, 2005

(65) Prior Publication Data

US 2006/0242713 A1    Oct. 26, 2006

(51) Int. Cl.
*G06F 21/00* (2006.01)
(52) U.S. Cl. .................... 726/21; 726/26; 713/182
(58) Field of Classification Search ................ 713/182, 713/185; 726/4–10, 17–21, 26
See application file for complete search history.

(56) References Cited

U.S. PATENT DOCUMENTS

| 5,655,077 | A | 8/1997 | Jones et al. |
|---|---|---|---|
| 5,774,551 | A | 6/1998 | Wu et al. |
| 5,864,665 | A | 1/1999 | Tran |
| 6,473,794 | B1 | 10/2002 | Guheen et al. |
| 6,609,198 | B1 | 8/2003 | Wood et al. |
| 6,651,168 | B1 | 11/2003 | Kao et al. |
| 6,799,178 | B2 | 9/2004 | Iwase et al. |
| 6,807,636 | B2 | 10/2004 | Hartman et al. |
| 6,982,962 | B1 | 1/2006 | Lunsford et al. |
| 7,065,360 | B2 | 6/2006 | Yahagi |
| 7,178,025 | B2 | 2/2007 | Scheidt et al. |
| 2002/0031230 | A1 | 3/2002 | Sweet et al. |
| 2002/0038333 | A1* | 3/2002 | Evans et al. .............. 709/107 |
| 2002/0112155 | A1 | 8/2002 | Martherus et al. |
| 2003/0046392 | A1 | 3/2003 | Wen et al. |
| 2003/0065626 | A1 | 4/2003 | Allen |
| 2003/0097574 | A1 | 5/2003 | Upton |
| 2003/0177388 | A1 | 9/2003 | Botz et al. |
| 2003/0212904 | A1 | 11/2003 | Randle et al. |
| 2004/0039909 | A1 | 2/2004 | Cheng |
| 2004/0088405 | A1 | 5/2004 | Aggarwal |

(Continued)

FOREIGN PATENT DOCUMENTS

RU    2158444 C2    10/2000

OTHER PUBLICATIONS

Andy Rathbone, "Windows XP for Dummies", 2001, Wiley Publishing Inc., pp. 62-64, 66, 106-107, 128 and 314.*

(Continued)

*Primary Examiner*—Gilberto Barron, Jr.
*Assistant Examiner*—Hadi Armouche
(74) *Attorney, Agent, or Firm*—Lee & Hayes, PLLC

(57) ABSTRACT

Systems and/or methods are described that enable a user to elevate his or her rights. In one embodiment, these systems and/or methods present a user interface identifying an account having a right to permit a task in response to the task being prohibited based on a user's current account not having that right.

15 Claims, 7 Drawing Sheets

U.S. PATENT DOCUMENTS

| | | | |
|---|---|---|---|
| 2004/0117358 A1 | 6/2004 | von Kaenel et al. | |
| 2004/0139355 A1 | 7/2004 | Axel et al. | |
| 2004/0210771 A1 | 10/2004 | Wood et al. | |
| 2004/0243824 A1* | 12/2004 | Jones | 713/200 |
| 2005/0091213 A1* | 4/2005 | Schutz et al. | 707/9 |
| 2005/0132070 A1 | 6/2005 | Redlich et al. | |
| 2005/0188313 A1* | 8/2005 | Matthews et al. | 715/741 |
| 2005/0188314 A1* | 8/2005 | Matthews et al. | 715/741 |
| 2005/0188317 A1* | 8/2005 | Matthews et al. | 715/744 |
| 2005/0235148 A1 | 10/2005 | Scheidt et al. | |
| 2005/0268107 A1 | 12/2005 | Harris et al. | |
| 2006/0075475 A1 | 4/2006 | Boulos et al. | |
| 2006/0085752 A1* | 4/2006 | Beadle et al. | 715/751 |
| 2006/0165060 A1 | 7/2006 | Dua | |
| 2006/0174308 A1* | 8/2006 | Fuller et al. | 725/133 |
| 2006/0174323 A1 | 8/2006 | Brown et al. | |
| 2006/0242427 A1* | 10/2006 | Ruzyski et al. | 713/186 |
| 2007/0106892 A1 | 5/2007 | Engberg | |
| 2007/0186106 A1 | 8/2007 | Ting et al. | |

OTHER PUBLICATIONS

Andress et al., "Test Center-New Products Test in Real-World Enviroments", Trinity 3.3, Information Security Magazine, Jan. 2002, Retrieved from the Internet.

Gamma, E. et al., "Design Patterns", 1995, Addison-Wesley, Reading, MA, USA, pp. 139-143, 148-150.

Lai, et al., "User Authentication and Authorization in the Java Platform", INSPEC, 1999, pp. 285-290.

Pittaway, et al., "Distributed security services in Microsoft Windows NT 5.0—Kerberos and the active directory", Information Security Technical Report, Elsevier Advanced Technology, vol. 4, 1999, pp. 20-21.

Wiseman, et al., "Adding Security Labelling to Windows NT", Information Security Technical Report, Elsevier Advanced Technoloy, vol. 4, 1999, p. 20-21.

Debian Admin, "Enable and Disable Ubuntu Root Password", Sep. 28, 2006, <<http://www.debianadmin.com/enable-and-disable-ubuntu-root-password.html>>.

Debian Administration, "Giving ordinary user root privileges, selectively.", Oct. 16, 2004, retrived at <<http://www.debian-administration.org/articles/33/print>>.

Direct User Switching Task for Windows XP, Aug. 24, 2003, retrived at <<http://web.archive.org/web/20030824072430/www.waybeyonduk.com/DUST/>>.

"GKSU: A gtk+ su front end Linux Man Page" retrived at <<http://www.penguin-soft.com/peguin/man/1/gksu.html>>.

Ha,"Red Hat Linux Getting Started Guide", Apr. 8, 2003, Red Hat, Incorporated, retrieved at <<http://web.archive.org/web/20030418075045/http://www.redhat.com/docs/manuals/linux/RHL-p-Manual/getting-started-guide/.>> pp. 35, pp. 74-75, pp. 105, pp. 146.

Ha, "Red Hat Linux Security Guide", Red Hat Docs, Apr. 8, 2003, retrieved at <<http://web.archive.org/web/20030418075045/http://www.redhat.com/docs/manuals/linux/RHL-9-Manual/getting-started-guide/.>> pp. 26-28.

Lawrence, "Using Sudo", Linus Tutorials, May 12, 2005, retrieved at <<http://web.archive.org/web/20050530041932/www.developertutorials.com/tutorials/linux/using-sudo-050511/page1.html>>.

Learning the shell, "Permissions", retrieved at <<http://www.linuxcommand.org/lts0070.php>>.

Linuxtopia, "Ubuntu FAQ Guide: Chapter 6- Users Administration", May 31, 2005, retrieved on <<http://web.archive.org/web/20060523005037/http://linuxtopia.org?online_books/system_administration_books/ubuntu_starter_guide/index.html>>.

Man Pages, "Ls.", retrieved at <<http://www.linuxcommand.org/man_pages/ls1.html>> on Apr. 9, 2009.

Microsoft help and Support, "How to make files and folders private in Windows XP so that only you have access to them", retrieved at <<http://supportmicrosoft.com/kb/930987/en-us>>.

Miller, "Sudo Manual", Jul. 11, 2004 retrived at <<http://web.archive.org/web/20040711020526/http://www.gratisoft.us/sudo/man/sudo.html>>.

Miller, "Sudoers Manual", Jul. 11, 2004, retrived at <<http://web.archive.org/web/20040711020555/www.gratisoft.us/sudo/man/sudoers.html>>.

Quick HOWTO: Ch09 : Linxus Users and Sudo, Dec. 23, 2005, retrived at <<http:web.archive.org/ web/20060203023004/http://www.linuxhomenetworking.com/wiki/index.php/Quick_HOWTO_:_Ch09_:_Linux_Users_and Sudo>>.

Sweet et al., "KDE 2.0 Development: 5.3. STandard Dialog Boxes", 2000, retrieved at <<http://developer.kde.org/documentation/books/kde-2.0-development/index.html>>.

The Elder Geek on Windows XP, "Switch User in Windows XP", retrived at <<http://web.archive.org/web/20041215071735/theeldergeek.com?HT0_005.htm>>.

"The KDE su Command", Nov. 20, 2004, retrieved on <<http://www.linfo.org/kdesu.html>>.

"The Ubuntu Quick Guide. Chapter 3. Applications Menu: System Tools.", retrieved on <<http://people.ubuntu.com/~mako/docteam/quickguide/ch03s07.html>>.

Ubuntu Documentation RootSudo, Dec. 31, 2005, retrieved at <<https://help.ubuntu.com/community/RootSudo>>.

Using Windows XP, Computer Setup and Maintenance, "How to swtich between users" Sep. 7, 2006, retrieved at <<http://www.microsoft.com/windowsxp/using/setup/winxp/switchusers.mspx>>.

* cited by examiner

RIGHTS ELEVATOR

TECHNICAL FIELD

This invention relates to elevating a computer user's rights.

BACKGROUND

Generally, two types of accounts are used to log a user on to a computer's operating system. One has nearly unlimited rights, often called an administrator account, the other has limited rights, often called a standard user account.

Standard user accounts permit some tasks but prohibit others. They permit most applications to run on the computer but often prohibit installation of an application, alteration of the computer's system settings, and execution of certain applications. Administrator accounts, on the other hand, generally permit most if not all tasks.

Not surprisingly, many users log on to their computers with administrator accounts so that they may, in most cases, do whatever they want. But there are significant risks involved in using administrator accounts. Malicious code may, in some cases, perform whatever tasks are permitted by the account currently in use, such as installing and deleting applications and files—potentially highly damaging tasks. This is because most malicious code performs its tasks while impersonating the current user of the computer—thus, if a user is logged on with an administrator account, the malicious code may perform dangerous tasks permitted by that account.

To reduce these risks, a user may instead log on with a standard user account. Logging on with a standard user account may reduce these risks because the standard user account may not have the right to permit malicious code to perform many dangerous tasks. If the standard user account does not have the right to perform a task, the operating system may prohibit the malicious code from performing that task. For this reason, using a standard user account may be safer than using an administrator account.

But the user may be prohibited from performing legitimate tasks—like installing a file known to be safe. To install this file, the user may need to switch to an account that has a right to permit the task. To do so with relative safety, the user may need to log off from the standard user account, log on to an administrator account, install the file, log off from the administrator account, and then log back on with the standard user account. This is disruptive.

To reduce this disruption, a user's rights may temporarily be elevated to permit a desired task. The user's rights may be elevated to those corresponding to rights held by an administrator account, for instance. In some cases, a dialog box pops up on the user's screen when an impermissible task is requested by an application. This dialog box often has two empty fields; one for typing in an account name (e.g., an administrator account) and another for typing in a password. Thus, a user may temporarily use the privileges of the selected account so that the task may be run to completion. Once the task is completed, the rights of the user may then return to those of his or her account such that these temporary privileges cease.

But to elevate his or her rights to perform a task, the user will often need to find or remember an administrator account name. This may be disruptive; a user may need to call someone to figure out the name, find some scrap of paper somewhere on which the user wrote it down some time ago, and the like. Also, the user may need to type the name in. Typing a relatively simple account name may, on its own, be a disruption. But many account names are complex, having a mix of letters, numbers, symbols, and lower- and upper-case characters. These names may cause a further disruption because they may requite that the user type slowly and carefully. Thus, searching for and typing in an account name to elevate rights may disrupt the user's workflow on the computer, especially if the user needs to elevate his or her rights often throughout the day.

SUMMARY

Systems and/or methods ("tools") are described that enable a user to elevate his or her rights. In one embodiment, the tools present a user interface identifying an account having a right to permit a task in response to the task being prohibited based on a user's current account not having that right. By so doing, the user may elevate his or her rights without having to search for or type in an account name.

BRIEF DESCRIPTION OF THE DRAWINGS

The same numbers are used throughout the disclosure and figures to reference like components and features.

DETAILED DESCRIPTION

Overview

The following disclosure describes one or more tools enabling a user to elevate his or her rights. In one embodiment, the tools present a user interface to a user whereby the user may elevate his or her rights without having to search for or type in an account name. This user interface may be presented in response to a request to perform a task requiring a right not permitted by the user's current account. In some cases, for example, the tools determine which accounts have rights sufficient to enable a user to perform a task not permitted by a user's current account. The tools may then present these accounts and enable the user to select and submit an authenticator for one of these accounts.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to a particular operating environment.

Figure 1:
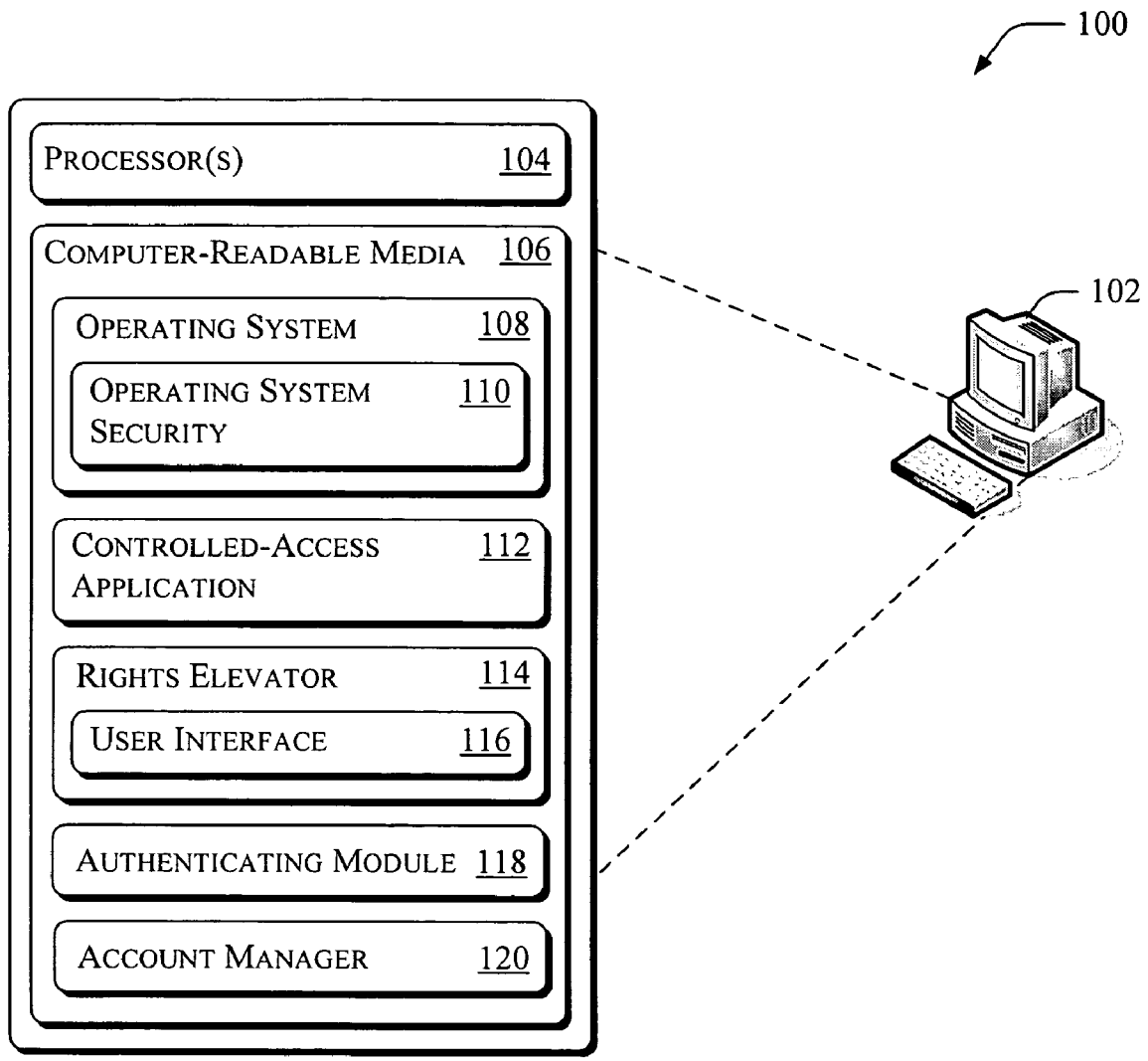
FIG. 1 illustrates an exemplary operating environment in which various embodiments can operate.

FIG. 1 illustrates one such operating environment generally at 100 comprising a computer 102 having one or more processor(s) 104 and computer-readable media 106. The processor(s) are capable of accessing and/or executing the computer-readable media. The computer-readable media comprises an operating system 108 having an operating system security 110, a controlled-access application 112, a rights elevator 114 having a user interface 116, an authenticating module 118, and an account manager 120.

Operating system 108 is capable of managing applications and tasks on computer 102. The operating system comprises operating system security 110, which is capable of determining whether a task is permitted by a user's current account and, if it is not, prohibiting that task from being performed. Computer 102 may also comprise controlled-access application 112. This application is capable of prohibiting tasks that may otherwise be permitted by a user's current account. One example of the controlled-access application is parental control software designed to prohibit specific tasks when a child is using the computer, such as a task to display a certain website, run a certain application, or perform any task during a certain time of day.

Rights elevator 114 is capable of elevating a user's rights; including permitting a task that is prohibited by a current user's account or the controlled-access application. The rights elevator may enable a user to elevate his rights from that of a limited-rights account, such as a standard user (e.g., non-admin) account, to a higher-rights account, such as an administrator account. The rights elevator may enable the user to elevate his or her rights through user interface 116, such as by presenting a name of a higher-rights account and enabling submission of an authenticator for that account.

Authenticating module 118 is capable of authenticating a selected account, such as by determining that a selected higher-rights account is submitted with an authentic password or other authenticating credential. Account manager 120 comprises information sufficient to determine what user accounts are available and the rights of those accounts.

Various embodiments of these elements, and particularly how these elements act and interact to perform an exemplary process and produce an exemplary user interface, are set forth in greater detail below.

Exemplary Embodiments for Elevating Rights

When a user is logged onto a computer with an account having limited rights, some tasks may be prohibited based on the user's current privilege context. If a user's current account does not permit a task, such as one requested by a software application or another by the user himself, the operating system may prohibit that task. In some cases this is advantageous, such as when the task requested is requested by malicious code. Also, whether the user's account permits the task or not, other software, such as controlled-access application 112, may act to prohibit that task from being performed. The following discussion describes exemplary ways in which elements of operating environment 100 enable an individual to elevate his or her rights, including permitting a delayed or previously prohibited task.

Figure 2:
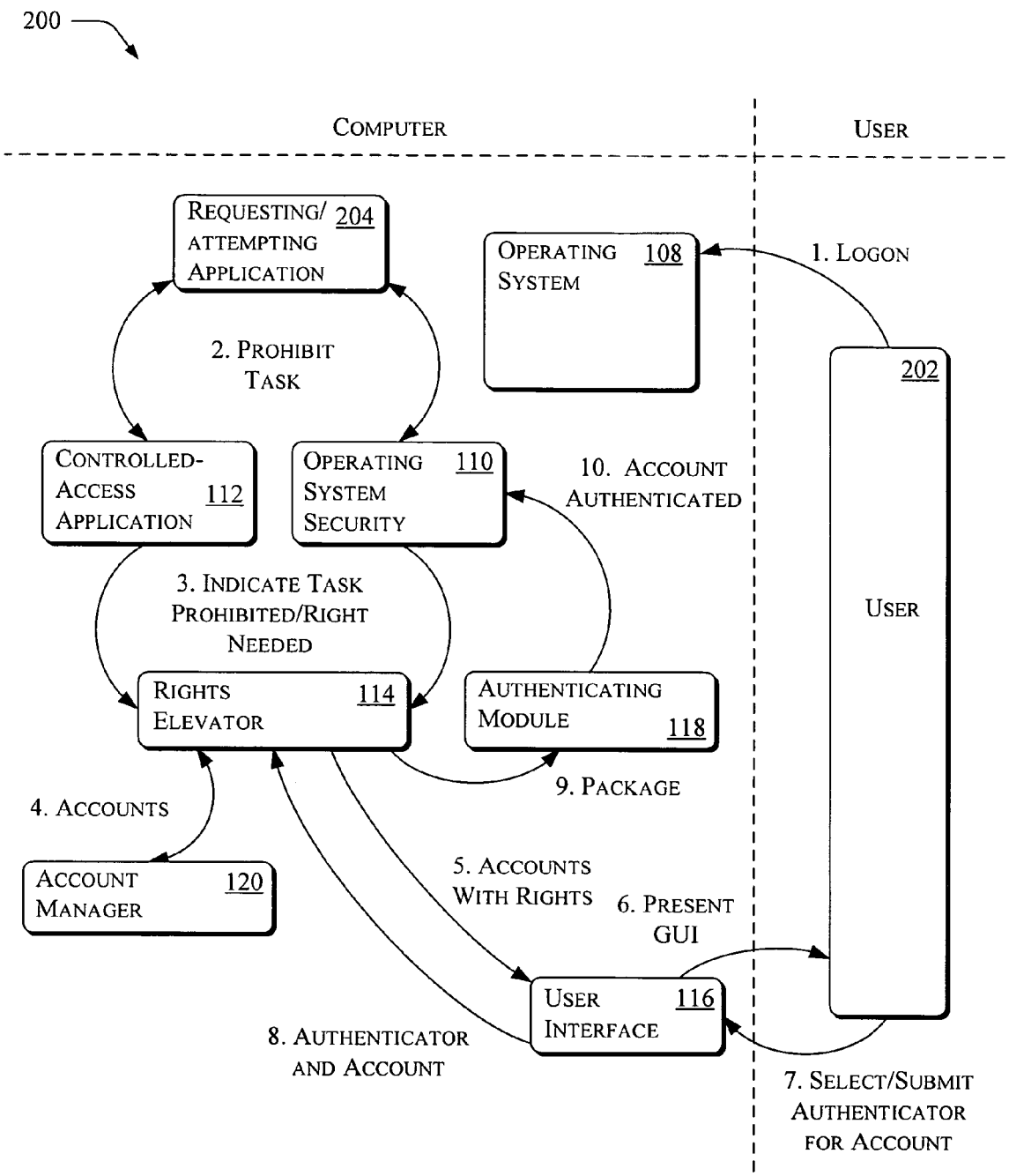
FIG. 2 is a flow diagram of an exemplary process for enabling a user to elevate rights.

Referring to FIG. 2, an exemplary flow diagram 200 for enabling a user to elevate rights is shown. Flow diagram 200 illustrates a set of actions by, and accompanying communications between, elements of the environment 100, a user 202, and an application 204. The elements shown are operating system 108, operating system security 110, controlled-access application 112, rights elevator 114, user interface 116, authenticating module 118, and account manager 120. The actions and accompanying communications are marked with arrows. The flow diagram is oriented showing computer actions and user actions, communication between the computer and the user represented by lines passing through a dashed line separating the two. This flow diagram may be implemented in any suitable hardware, software, firmware, or combination thereof. In the case of software and firmware, this diagram represents sets of operations implemented as computer-executable instructions.

At arrow 1, user 202 logs into operating system 108 with an account having limited rights. The account's limited right to perform tasks may be enforced by operating system security 110 and/or controlled-access application 112.

After the user logs onto the computer, a task is requested or attempted by application 204. The task may be initiated with or without the user's interaction. The user may have initiated, directly or indirectly, the task being attempted, such as by attempting to install an application downloaded over the Internet. In this case application 204 may be a download module, network browser, file manager, or the like. In other cases, the user may not have initiated the task, such as is often the case when malicious code requests or attempts a task.

At arrow 2, operating system security 110 and/or controlled-access application 112 prohibits the task from being performed. In one embodiment, the controlled-access application intercepts the task prior to it being performed, checks the task against the rights of user 202's current account, determines that the task is not permitted, and prohibits the task from being performed.

In another embodiment, the operating system security intercepts the task attempted by application 204, determines that the task is not permitted by the rights of user 202's current account, and prohibits the task.

At arrow 3, the operating system security and/or controlled-access application communicate with rights elevator 114, indicating that a task has been prohibited and/or that a right is needed. In some cases, one of these applications communicates to the rights elevator the type of task, what type of rights are needed in order to permit the task, and/or the type of account needed to permit the task (e.g., an unlimited rights account).

At arrow 4, rights elevator 114 determines which accounts, if any, have rights sufficient to permit the prohibited task. The rights elevator may do so, in one embodiment, by communicating with account manager 120, such as by passing a flag for accounts having unlimited rights according to an application program interface (API). By so doing, the rights elevator may find, receive, or determine indicators or other identifying information sufficient to enumerate one or more of these accounts. The account manager may return all accounts having sufficient rights to permit the prohibited task, such as all administrator or other nearly unlimited-rights accounts, and/or other accounts explicitly marked for presentation to a user.

At arrow 5, rights elevator communicates accounts having sufficient rights to user interface 116. These accounts are those capable of permitting a task that is not permitted by the user's current privileges. The rights elevator may communicate these accounts by passing a flag to the user interface with information sufficient to identify the accounts, such as with names, icons, and the like.

At arrow 6, user interface 116 presents a graphical user interface (GUI) to the user having at least one account with rights sufficient to permit the prohibited task. The graphical use interface may comprise one, many, or all accounts having sufficient rights. In some cases all of the accounts may be so many as to be cumbersome. In these cases, the user interface and/or rights elevator may select which to present based on various criteria, such as frequency of use, those associated with the current user, those with sufficient but not unlimited rights, and the like.

The accounts so presented may be identified to the user, thereby permitting the user to know which account is which. One potential benefit of this is that the user, by knowing which account is which, may select one without having to find or type in the name of the account. The accounts may be identified with graphics (e.g., graphic tiles or icons), text (e.g., a name of each account), and the like.

Figure 3:
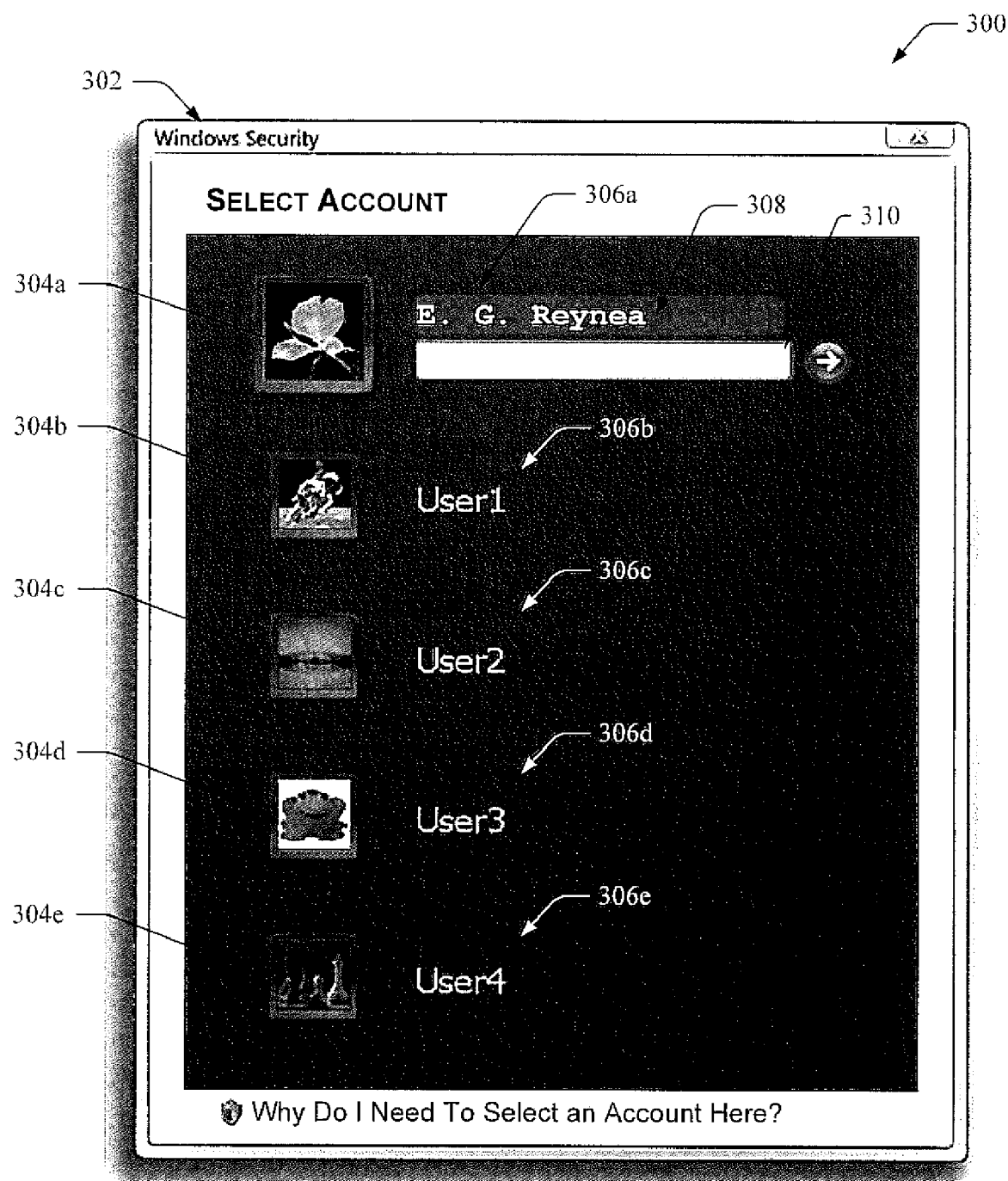
FIG. 3 illustrates an exemplary graphical user interface having multiple accounts.

Referring to FIG. 3, a screen shot 300 showing graphical user interface 302 is shown. Five accounts having sufficient rights are shown, each with a graphic region 304 (labeled 304a, 304b, 304c, 304d, and 304e) and a name region 306 (labeled 306a, 306b, 306c, 306d, and 306e). Each of the graphics may indicate the account or a user associated with that account. Thus, if an account's graphic represents the information technology department's on-call technician, for instance, the user may know to contact that technician for a password or other help. If, on the other hand, different graphics represent different parents or guardians of a child using a computer, the child may know which parent to ask for a password to perform the prohibited task and which password field to type in that password (if multiple fields are shown). The name regions comprise names identifying the accounts, here "E. G. Reynea", "User1", "User2", "User3", and "User4".

The graphical user interface also permits a user to submit an authenticator for an account. In one embodiment, each of the accounts has an associated authenticator region. This permits a user to enter a password or other authenticator for an account and, by so doing, also select that particular account.

In the illustrated embodiment, the graphical user interface comprises a single authenticator region 308 having a data-entry field 310 for entry of a password. In this case, a user may select an account, such as by clicking on a graphic in graphic region 304a or text in name region 306a for the "E. G. Reynea" account. The user may then type a password into data-entry field 310 of authenticator region 308. This data-entry field may exist prior to a user's selection of an account; in this case a user's selection indicates to which account the user wants to associate a password input to the field. In this embodiment, however, user interface 116 presents authenticator field 308 near an account once that account is selected.

Figure 4:
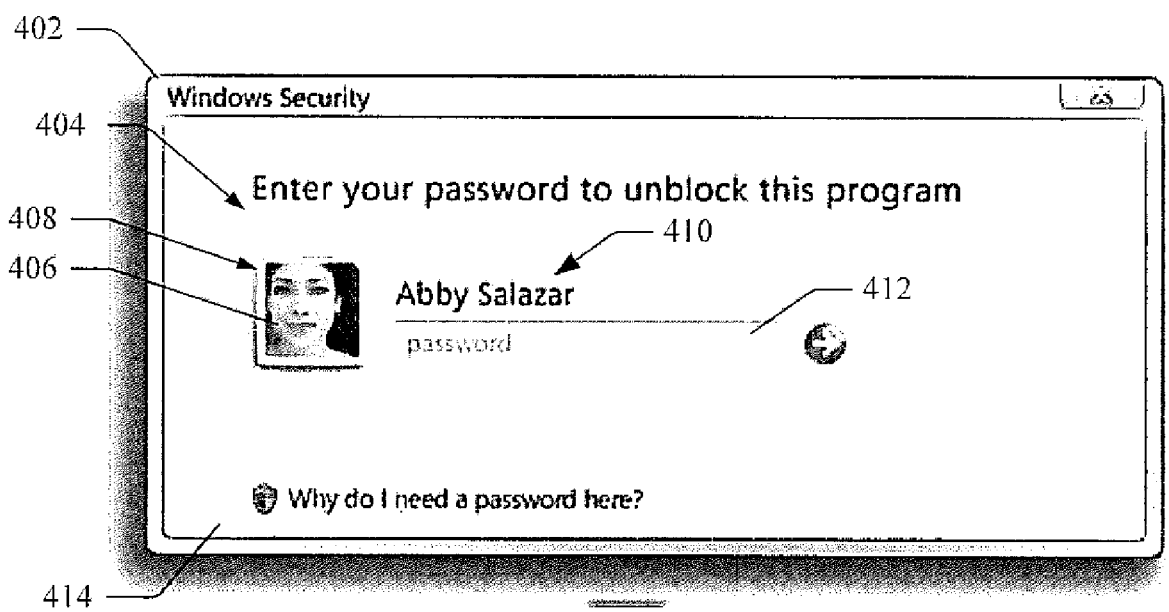
FIG. 4 illustrates an exemplary graphical user interface having a single account.

Referring to FIG. 4, an exemplary single-account graphical user interface 402 is shown. In this embodiment, an account 404 having sufficient rights to permit the prohibited task is shown with two identifiers. The first identifier, that of the current user's picture 406 at graphic region 408, identifies the person associated with the account. The second identifier, that of the account's name, entitled "Abby Salazar" and shown at name region 410, identifies the person associated with the account and the account itself.

This account may have the same name and identifier as that of the user's current, limited-rights account. It also may be authenticated with the same authenticator (e.g., password) as used for the user's current limited-rights account. Thus, if a user's current, limited-rights account name is "Abby Salazar" (shown at 410) and password is "Abby" (not shown), the user may elevate her rights to permit the prohibited task simply by entering "Abby" into authenticator field 412. Also, the user does not need, in this case, to remember an account that she has not recently used because the account and password are the same as the ones she entered at arrow 1 to logon to the operating system.

This may be enabled in various ways. In one case, there are two accounts, one with limited rights and one with higher or unlimited rights. Each account has the same name and password, but the higher-rights account is not available for logging into at arrow 1 (when logging onto the operating system). The higher-rights account, however, is made available by the rights elevator by virtue of its having sufficient rights to permit the prohibited task. Conversely, the limited-rights account may not be presented by virtue of it not having sufficient rights.

In another embodiment, there is one account having two tags; one tag is associated with limited rights and one tag is associated with higher rights. By default the account may be tagged with the limited-rights tag when logging in. This tag may be altered by the rights elevator on entry of the user's password in the graphical user interface, such as into field 412 of FIG. 4.

Also, user interface 116 may provide information about the task and/or what entity requested or attempted to perform the task. In the illustrated embodiment of FIG. 4, a help graphic 414 is shown, entitled "Why do I need a password here?". Responsive to selecting this help graphic, the user interface may describe the task and/or the entity.

At arrow 7, user interface 116 receives the user's selection of and/or authenticator for an account. At arrow 8, the user interface sends the account and authenticator to be authenticated. In the illustrated embodiment, the user interface sends an indication of the account selected and an authenticator for that account to the rights elevator. Continuing the illustrated embodiment shown in FIG. 4, the user may enter password "Abby", after which the user interface sends "Abby" and "Abby Salazar" to the rights elevator.

At arrow 9, rights elevator 114 packages the authenticator and associated account and communicates these to authenticating module 118. In one embodiment, this package is a computer-readable package with the authenticator and the account associated with the authenticator, all in a format readable and analyzable by the authenticating module. In another embodiment, the authenticating module is part of and integral with operating system security 110 or controlled-access application 112.

At arrow 10, the account is authenticated (or not authenticated). If it is not authenticated, rights elevator 114 and user interface 116 may repeat arrows 5, 6, 7, 8, and/or 9 until the account is authenticated at arrow 10. The authentication of the account may be communicated to the entity prohibiting the task, such as operating system security 110, shown in FIG. 2.

Following performance of or permission to perform the prohibited task, rights elevator 114 may return to the user to his or her limited-rights account. In at least this sense the elevation of rights may be temporary. The rights elevator may also immediately reduce the rights (and thus the account to the limited account) or tie the elevated right to just the prohibited task. In this case, only the prohibited task may be permitted by elevating the rights of the user. This may help to reduce security risks inherent in the rights of the user being elevated for too long. It also may reduce the risk of a task being performed that is not permitted by the user's limited-rights account without the user elevating his or her rights specifically to permit that task.

Unlocking a Task

Various applications may call rights elevator 114 to enable a user to elevate his or her rights. This may be indirect, such as when an application attempts to perform a task that is prohibited by an operating system. It may also be direct, such as when an application—even if it has not yet attempted a task—calls the rights elevator to enable a user to elevate his or her rights. Protocols (e.g., APIs) followed to call the rights elevator and its user interface may be public, thereby enabling various applications to call the rights elevator without first attempting a prohibited task.

In the following exemplary embodiment, an application responsible for presenting and altering a system's date and time settings calls rights elevator 114 (e.g., requesting/attempting application 204 of FIG. 2). This application calls the rights elevator responsive to a user selecting to unlock the date and time of an operating system. The task of altering the system's date and time may not be one currently permitted by the user's rights.

Figure 5:
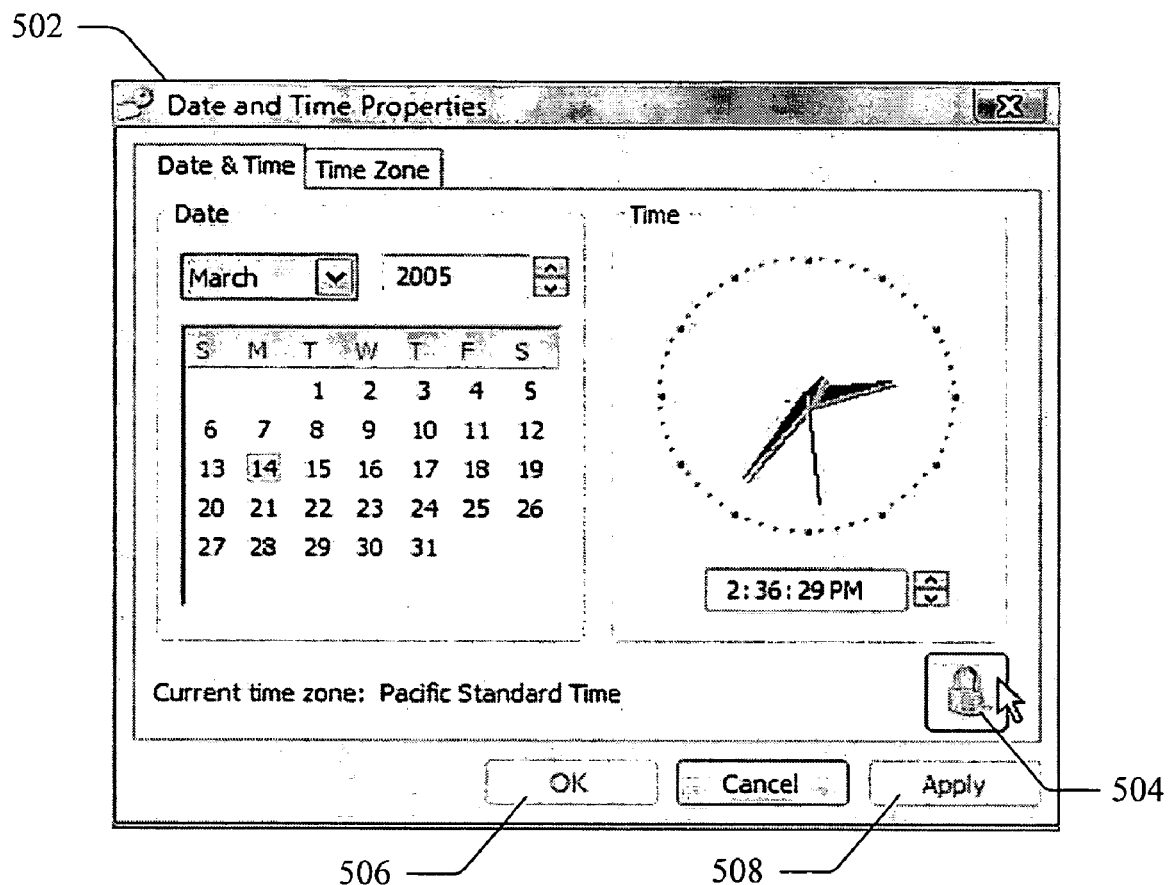
FIG. 5 illustrates an exemplary date and time dialog having an unlock button.

Referring to FIG. 5, a date and time dialog 502 having an unlock button 504 is shown. This unlock button prompts a user interface through which a user may select to unlock a task. Dialog 502 presents the date and time to the user but does not permit the user to alter the date or time. This prohibition is indicated by "OK" and "Apply" buttons 506 and 508 being un-selectable, as well as the presence of the unlock button showing a locked padlock icon. A user may select to elevate his or her rights by clicking on unlock button 504.

In response to this selection, the dialog generates a call to rights elevator 114. This call may follow a published API. The call indicates to the rights elevator that the user's rights may need to be elevated. This is one example of an application (such as application 204 or system security 110 of FIG. 2) communicating with rights elevator 114, similar to the acts set forth above at arrow 3.

Responsive to receiving this call, the rights elevator presents a graphical user interface enabling the user to elevate his or her rights. The rights elevator may do so similarly to as set forth above, such as by performing acts described at arrows 4, 5, and 6 (along with user interface 116).

Figure 6:
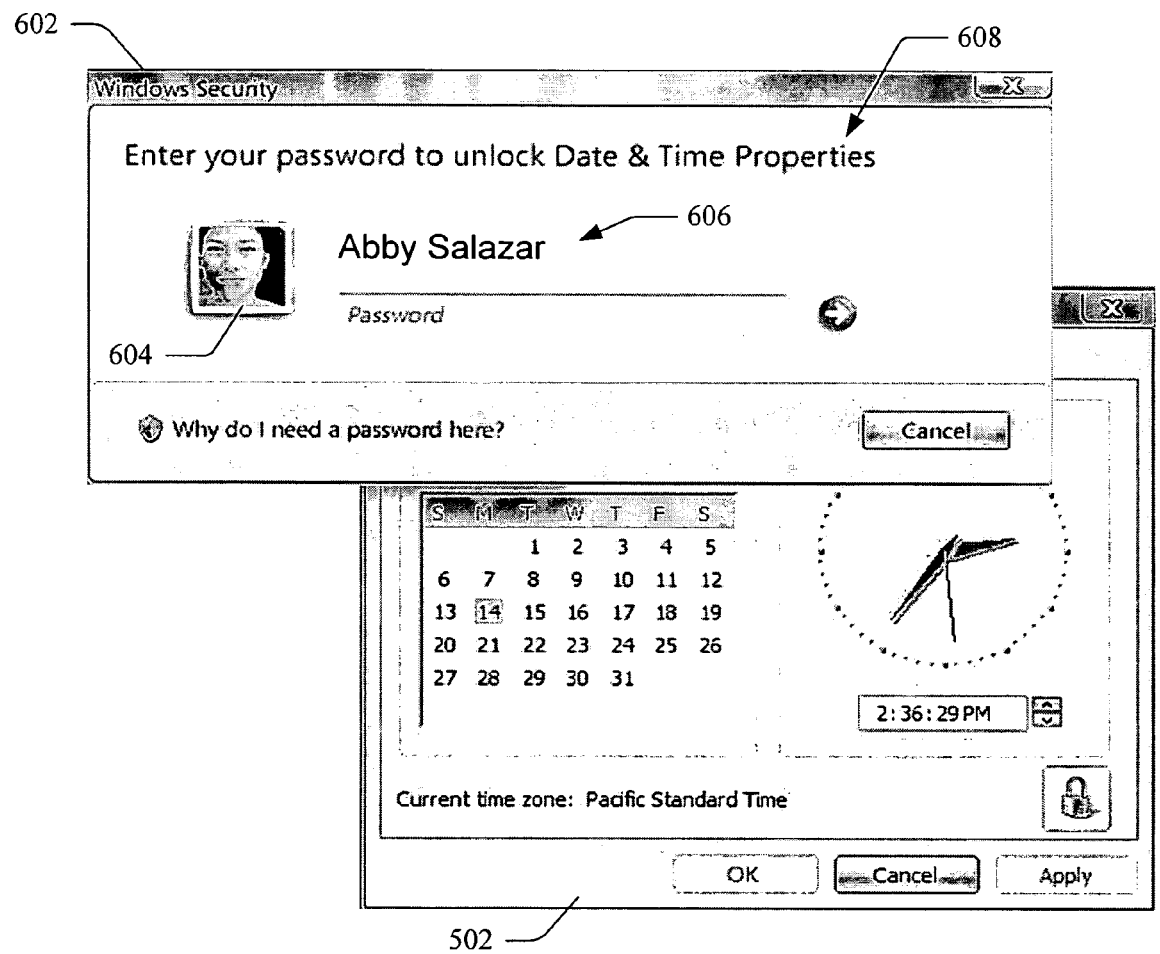
FIG. 6 illustrates an exemplary user interface showing one account having sufficient rights to unlock a task.

Referring to FIG. 6, an exemplary user interface 602 is shown. This user interface shows one account having sufficient rights to unlock the task. Two identifiers are used for this account, a user's picture 604 and the account's name, entitled "Abby Salazar", shown at 606. The user interface permits the user to submit an authenticator for the account, here with a password. This is indicated by a description 608 of what is needed to unlock the task: "Enter your password to unlock Date & Time Properties".

Responsive to receiving the user's password for an account, the user interface forwards the account and password for authentication by authenticating module 118 of FIG. 1. This may be performed with the actions described as part of arrow 8 and/or 9 of FIG. 2.

Responsive to the account being authenticated, the application responsible for the system's date and time presents a user interface showing the user that the task is unlocked.

Figure 7:
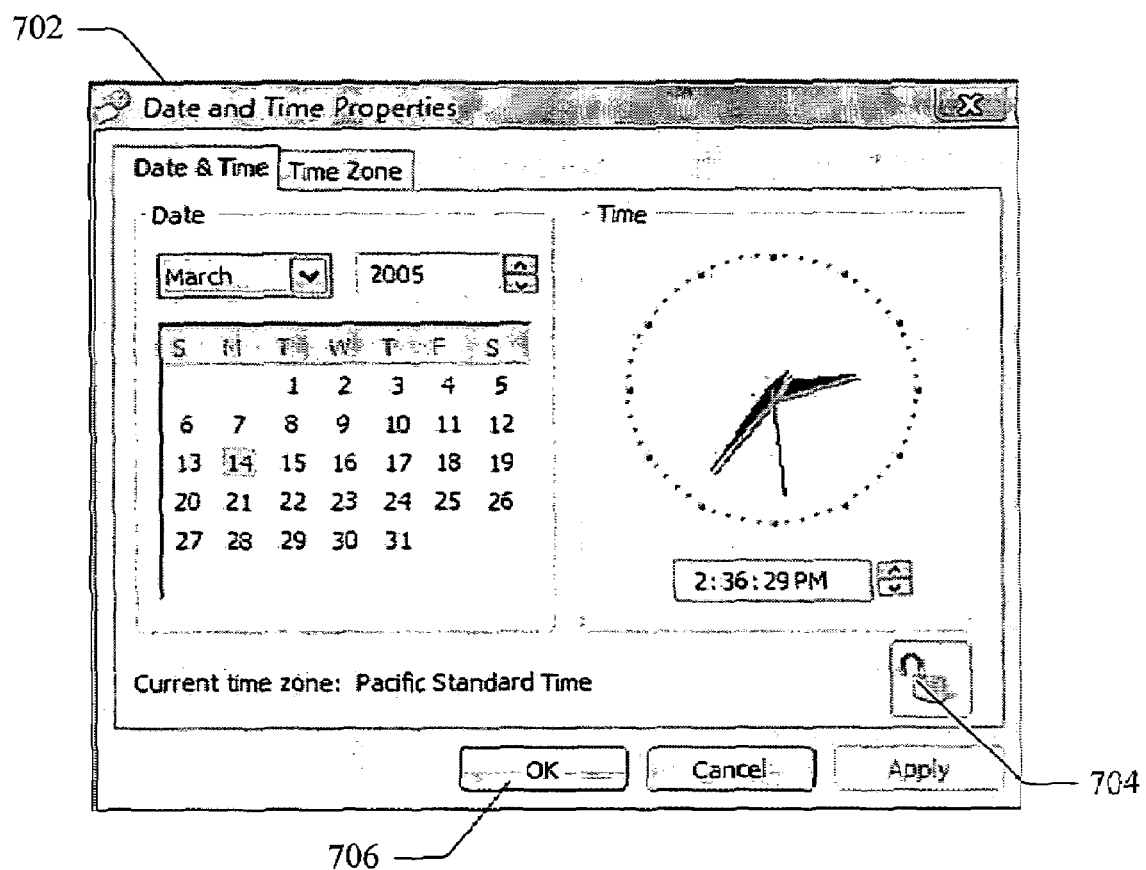
FIG. 7 illustrates an exemplary unlocked task dialog.

In FIG. 7, an exemplary unlocked task dialog 702 is shown. This dialog shows—in contrast to dialog 502 of FIG. 5—that the task is unlocked. Button 504 of FIG. 5 now shows in FIG. 7 an unlocked padlock icon at 704. This difference is also shown with the OK button 506 of FIG. 5 now being selectable, shown at 706 in FIG. 7.

Once the user completes the task or chooses not to perform the task, the user's rights may return to that of the user's limited-rights account. Thus, the user may change the date or time and select the OK button. After this, the task to change the date and time again may be locked.

CONCLUSION

Systems and/or methods are described that enable a user to elevate his or her rights, including through a user interface identifying an account with these rights. By so doing, these systems and/or methods may permit a user to use a computer in relative safety from attacks by malicious code while also enabling the user to easily elevate his or her rights to perform potentially dangerous tasks. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having computer-readable instructions therein that, when executed by a computing device, cause the computing device to present a user interface in response to a task being prohibited based on a user's current account not having a right to permit the task, the user interface comprising:
   information indicating the task and an entity that attempted the task;
   a selectable help graphic wherein responsive to receiving selection of the selectable help graphic, the computer-readable instructions further cause the computing device to present the information;
   identifiers, each of the identifiers identifying other accounts having a right to permit the task, wherein the identifiers presented are based on criteria comprising:
     frequency of use;
     association with the user; and
     indication of sufficient but not unlimited rights;
   one of the identifiers identifies a higher-rights account having a right to permit the task, wherein the one of the identifiers comprises:
     a graphic identifying the higher-rights accounts associated with the user; and
     a name of the higher-rights account;
   an authenticator region capable of receiving, from the user, an authenticator usable to authenticate the higher-rights account having the right to permit the task, wherein:
     the authenticator comprises a password, and
     the authenticator region comprises a data-entry field configured to receive the password.

2. One or more computer-readable media having computer-readable instructions therein that, when executed by a computing device, cause the computing device to perform acts comprising:
   determining multiple accounts capable of permitting a task not permitted by an account of a current user wherein the determining is based on criteria comprising:
     frequency of use;
     association with the current user; and
     indication of sufficient but not unlimited rights;
   receiving indicators for the multiple accounts capable of permitting the task;
   presenting a graphical user interface, the graphical user interface having:
     multiple account regions, each account region identifying one of the multiple accounts capable of permitting the task;
     an authenticator region capable of receiving an authenticator for one of the multiple accounts capable of permitting the task;
   receiving, through the graphical user interface, the authenticator for one of the multiple accounts capable of permitting the task; and
   responsive to receiving the authenticator for one of the accounts capable of permitting the task, packaging, into a computer-readable package, the received authenticator and the account capable of permitting the task associated with the authenticator, the package effective to enable authentication of the account capable of permitting the task.

3. The media of claim 2, where the each account region comprises a name identifying one of the multiple accounts capable of permitting the task.

4. The media of claim 2, where the each account region comprises a graphic identifying one of the multiple accounts capable of permitting the task.

5. The media of claim 2, further comprising permitting the task.

6. The media of claim 2, further comprising authenticating the account capable of permitting the task and, responsive to authenticating the account capable of permitting the task, temporarily elevating rights of the current user to that of the account capable of permitting the task effective to permit the task.

7. The media of claim 2, wherein rights of the account of the current user are limited by controlled-access software.

8. The media of claim 7, wherein the task is prohibited by the controlled-access software prior to authentication of the account capable of permitting the task and wherein the controlled-access software refrains from prohibiting the task in response to authentication of the account capable of permitting the task.

9. One or more computer-readable media having computer-readable instructions therein that, when executed by a computing device, cause the computing device to perform acts comprising:
   presenting a higher-rights account to a computer user currently logged on to a computer's operating system with a limited-rights account, the higher-rights account having a right to permit a task currently prohibited by the operating system based on the limited-rights account not having the right to permit the task, the higher-rights account presented with an identifier capable of identifying a name of the higher-rights account or a person associated with the higher-rights account, wherein the act of presenting the higher-rights account comprises presenting additional higher-rights accounts, each additional higher-rights account being presented with an additional identifier capable of identifying a name of the additional higher-rights account or a person associated with the additional higher-rights account and wherein the additional higher-rights accounts being presented are determined based on criteria comprising:
   indication of sufficient but not unlimited rights;
   frequency of use; and
   association with the current user;
   an authenticator region configured to receive an authenticator, the authenticator usable to authenticate the higher-rights account wherein the authenticator received comprises a password that is the same authenticator used for the user's current limited-rights account and the authenticator region comprises a data-entry field into which the user may type the password;
   authenticating the higher-rights account; and
   temporarily elevating the computer user's rights to that of the higher-rights account effective to permit the operating system to cease prohibiting the task.

10. The media of claim 9, wherein the act of presenting the higher-rights account comprises presenting a graphical user interface comprising the identifier and a data-entry field capable of receiving entry of the authenticator.

11. The media of claim 9, wherein the act of temporarily elevating the computer user's rights comprises elevating the computer user's rights only for so long as is needed to permit the operating system to cease prohibiting the task.

12. The media of claim 9, wherein the act of temporarily elevating the computer user's rights comprises returning the computer user's rights to those of the limited-rights account once the operating system ceases to prohibit the task.

13. The user interface of claim 1, wherein the identifiers presented include the identifier of the user's current account having limited rights.

14. The user interface of claim 1, wherein the authenticator received is the same as the authenticator used for the user's current limited-rights account.

15. The media of claim 2, further comprising authenticating the account with the same identifier and authenticator as used for the user's current account.

* * * * *